United States Patent [19]

Konforti et al.

[11] 4,392,155

[45] Jul. 5, 1983

[54] METHOD AND APPARATUS FOR IMAGE SUBTRACTION IN ORDER TO EXTRACT NON-COMMON INFORMATION FROM TWO LIGHT IMAGES

[75] Inventors: Naim Konforti, Holon; Emanuel Marom, Tel Aviv, both of Israel

[73] Assignee: Ramot University Authority for Applied Research & Industrial Development Ltd., Tel Aviv, Israel

[21] Appl. No.: 216,009

[22] Filed: Dec. 12, 1980

[51] Int. Cl.³ ............................................. H04N 7/18
[52] U.S. Cl. .................................... 358/106; 358/111; 356/393; 356/239; 250/237 G
[58] Field of Search ............. 250/237 G, 572; 358/83, 358/93, 89, 95, 90, 96, 105, 106, 107, 111; 356/388, 389, 390, 391, 392, 393, 397, 396, 239

[56] References Cited
U.S. PATENT DOCUMENTS 3,114,797 12/1963 Williams .............................. 358/105
3,952,150 4/1976 Gerardin et al. ................... 358/106

Primary Examiner—Robert L. Griffin
Assistant Examiner—Edward L. Coles
Attorney, Agent, or Firm—Benjamin J. Barish

[57] ABSTRACT

Apparatus for image subtraction in order to extract non-common information from two light images comprises a TV camera tube including a photosensitive coating on its inner face and a grating on its outer face spaced from the photosensitive coating by the thickness of the tube; projectors for projecting the two light images simultaneously, from slightly different angles, onto the photosensitive coating via the grating such that the shadow of the grating interlaces the two light images on the photosensitive coating; and a scanner for electronically scanning the interlaced images on the photosensitive coating to produce a video output, and for processing same to select only the image information which is non-common to the two optical images.

16 Claims, 1 Drawing Figure

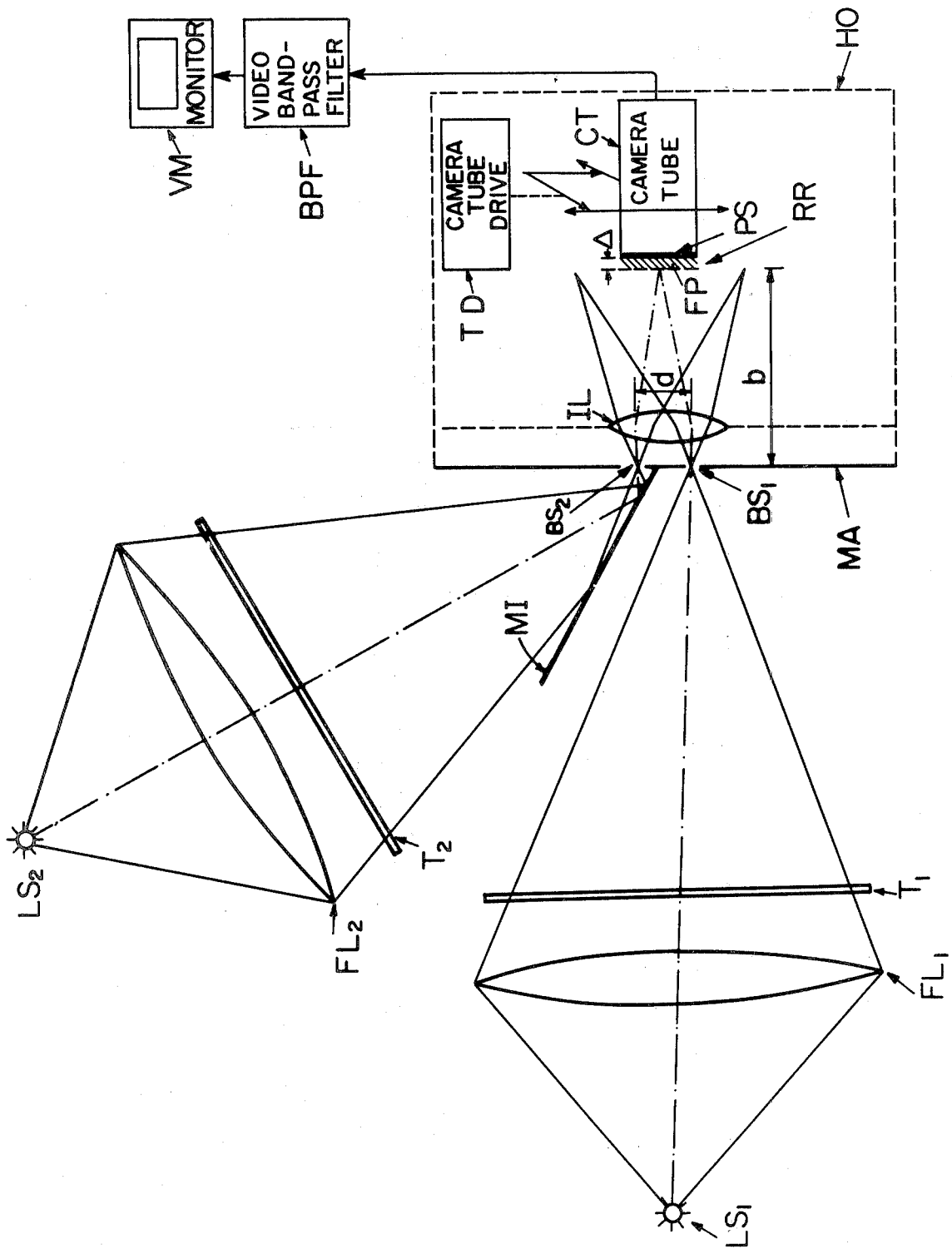

METHOD AND APPARATUS FOR IMAGE SUBTRACTION IN ORDER TO EXTRACT NON-COMMON INFORMATION FROM TWO LIGHT IMAGES

BACKGROUND OF THE INVENTION

The present invention relates to a method and apparatus for image subtraction in order to extract non-common information from two light images.

The observation of two images in order to emphasize the difference between them is of extreme importance in many fields, e.g., in the medical field for comparison of X-ray transparencies, in aerial photography for comparison of images, and in industry for detection of defects, a good example being the microelectronic mask industry.

Many techniques for the extraction of the difference information have been proposed. Some of these techniques are based on coherent illumination (lasers); others require the generation of an intermediate step (usually a photographic record) and therefore cannot be performed in real time; and others are limited to transparencies as input functions.

One known technique is described in the article titled "Real Time Grid Coding and Interlacing by Image Subtraction" by N. Konforti and E. Marom in *Applications of Holography and Optical Data Processing*, Pergamon Press (1977), pages 85-91. The principle behind the real time coding according to this technique is based on the projection of the two images that are to be compared onto a common plane in perfect registration. However, the optical system is such that the images are projected onto the common plane from slightly different orientations. By positioning a grating, e.g., a Ronchi ruling grid, just in front of this common plane, the shadow of the grating provides the necessary coding such that the two images are interlaced on the common image plane, with the non-common information being modulated by the grating frequency and the common information being modulated by double the grating frequency or a higher-multiple thereof. Thus, by the use of known filtering techniques, the common information may be suppressed and only the non-common information may be outputted for further processing or for further display. The system described in the above-cited article provides real time coding and interlacing by the use of a beam-splitter which projects the two images simultaneously from slightly different angles onto a photographic plate via the Ronchi ruling grid spaced a short distance in front of a photographic plate such that the shadow of the grid interlaces the two light images impinging the photographic plate. However, the filtering operation described in that article cannot be performed in a real time manner. Further details as to the construction and operation of such a system are found in the above-cited article, which is herein incorporated by reference.

BRIEF SUMMARY OF THE INVENTION

An object of the present invention is to provide an improved real time image subtraction technique which has advantages over that described in the above-cited article as well as in the other above-mentioned techniques. More particularly, an object of the present invention is to provide a subtraction scheme and apparatus that can handle any kind of input (transparencies, CRT displays, real objects, etc.), and which can display the difference information without delay (real time operation). This would enable the operator to manipulate the input scenes (change illumination conditions, position, orientation, etc.) and observe the effects on the subtracted results.

According to one broad aspect of the present invention, there is provided a method of image subtraction for extracting non-common information from two light images, characterized in that the two light images are optically projected simultaneously from slightly different angles onto a photosensitive coating of a TV camera tube via a grating spaced a predetermined short distance in front of the photosensitive coating, such that the shadow of the grating interlaces the two light images on the photosensitive coating; and the interlaced light images on the photosensitive coating are electronically scanned and processed to output only the information which is not common to the two images.

The method is particularly advantageous when the grating is formed on the outer face of the camera tube, whose inner face includes the photosensitive coating, such that said predetermined short distance is equal to the thickness of the camera tube.

According to another important feature, present in the preferred embodiment of the invention described below, one of the two light images is optically projected simultaneously with the other onto the photosensitive coating via a mirror which reflects the one image through a first slit to impinge the grating at a slightly different angle from that of the other image, the latter image impinging the grating through a second slit spaced from the first slit.

The above method, as well as the apparatus for implementing it as to be described below, provides a number of important advantages over the previously-known techniques briefly mentioned above. Thus, real time processing is effected; moreover, it is effected without the use of a ground glass plate on which the TV camera tube would be focused, thereby eliminating the noise and light scattering that would be involved in the use of such a ground glass plate. In addition, the need of a beam-splitter is avoided which substantially increases the light efficiency and also reduces the cost. Further, only one lens, namely the imaging lens, is required in the substraction system (i.e., apart from the projection system), instead of the two lenses required in the previously-described system. In addition, the novel technique, in a relatively simple manner, permits precise interlacing alignment by moving the camera tube along the optical axis of the imaging lens, and also permits selection of a portion of the light image to be scanned and processed by moving the camera tube laterally of the imaging lens optical axis.

Further features and advantages of the invention will be apparent from the description below.

BRIEF DESCRIPTION OF THE DRAWING

The invention is herein described, somewhat diagrammatically and by way of example only, with reference to the accompanying single FIGURE of drawing illustrating one form of apparatus in accordance with the present invention.

DESCRIPTION OF A PREFERRED EMBODIMENT

In the apparatus illustrated in the accompanying drawing, the two images to be compared, in order to emphasize the differences between them (i.e., to extract the non-common information), are found in the two transparencies $T_1$, $T_2$. The two transparencies are illuminated by two point light sources $LS_1$, $LS_2$ via field lenses $FL_1$, $FL_2$, which lenses image the point sources into two distinct regions of an imaging lens IL via slits $BS_1$, $BS_2$ in a mask MA. The latter slits are elongated, parallel, in a common plane (represented by their mask MA), and are separated by the distance "d". The optical axis of field lens $FL_1$ passes through slit $BS_1$; but the optical axis of field lens $FL_2$ intersects a planar mirror MI disposed a short distance in front of slit $BS_2$ for reflecting the light from its source through slit $BS_2$.

Lens IL projects the images of the two transparencies $T_1$, $T_2$ onto a common plane occupied by the photosensitive coating PS of a TV camera tube CT, via a grating, in the form of a Ronchi ruling grid RR as described in the above-cited article. In this case, however, the Ronchi ruling grid is formed on the outer surface of the face plate FP of the camera tube CT so as to be spaced slightly in front of the photosensitive coating PS such that the shadow of the grating interlaces the two light images received on the photosensitive coating PS.

The photosensitive coating PS is separated from the plane of the Ronchi ruling grid RR by the distance "$\Delta$", which in this case is determined by the thickness of the camera tube face plate FP. This distance ($\Delta$) should be such that the two images from the transparencies $T_1$, $T_2$ are interlaced by half the periodicity of the grating structure of the code while the images themselves are still accurately superimposed on the photosensitive coating PS. The design parameters for determining this distance ($\Delta$) are set forth below.

The images of the two transparencies $T_1$, $T_2$ thus interlaced on the photosensitive coating PS of the camera tube CT may be electronically scanned and processed to output only the information which is not common to the two images. For this purpose, the camera tube CT is focused on the interlaced images on the photosensitive coating PS so that the grid pattern produced by the grating RR is oriented vertically. The photosensitive coating PS is then scanned horizontally by the electronic beam of the camera tube CT so as to generate, in addition to the image information, a high frequency signal due to the electronic beam crossing the grid pattern. The common information of the two images will thus be modulated by a frequency which is double the grid frequency or a higher multiple thereof, while the non-common information, i.e., the difference between the two images, will be modulated by the grid frequency itself.

The video signal outputted from the camera tube CT may thus be fed to a video band pass filter BPF which passes only the grid frequency information to a video monitor VM. As a result, only those portions of the video signal representing the non-common information in the two images will be outputted to the video monitor VM, whereas the portions of the video signal representing the information common to the two images will be suppressed.

The camera tube CT is disposed within a housing, schematically indicated by the broken lines HO, the imaging lens IL being fixed within the housing. The mask MA, containing the two elongated slits $BS_1$, $BS_2$ is also fixed with respect to the housing and the imaging lens IL.

The mirror MI is also fixed with respect to the housing just in front of the mask. The mirror MI is preferably built on a thin substrate and mounted as close as possible to slit $BS_2$ along the respective light beam path and at an angle of 30° in relation to the optical axis of the imaging lens IL. In this way, the beam path through transparency $T_2$ will be deviated by 60°. In some cases, it may be more convenient to use two mirrors, one at 60° to the other, symmetrically disposed with respect to the optical axis; in such a case, a prism may be used as the substrate of the mirror.

The camera tube CT is not fixed within the housing HO, but rather is movably mounted in both the axial direction (i.e., parallel to the optical axis of the imaging lens IL), and also in the lateral or transverse direction (i.e., transversely to this optical axis). The apparatus further includes a camera tube drive TD which is actuable in order to move the camera tube CT in either of the above directions. Thus, the camera tube CT may be moved by drive TD in the axial direction parallel to the axis of the imaging lens IL in order to obtain precise interlacing alignment, and may also be moved in the lateral direction of the imaging lens optical axis in order to select the portion of the light images to be scanned and processed.

The spatial frequency of the Ronchi ruling grid RR is determined by the resolution limit of the TV camera system. The distance $\Delta$ between the photosensitive surface and the Ronchi ruling grid RR should be $$\Delta < a^2/5\lambda$$

wherein: "$\lambda$" is the light wavelength in the medium (tube face plate FP), separating the Ronchi ruling grid RR from the photosensitive coating PS; and "a" is the spatial period of the Ronchi ruling grid RR.

The distance "d" between the two slits $BS_1$, $BS_2$ in the mask MA should be $$d = abn/2\Delta$$

wherein: "n" is the refractive index of the medium (tube face plate FP) separating the Ronchi ruling grid RR from the photosensitive surface PS; and "b" is the distance between the mask slits $BS_1$, $BS_2$ and the Ronchi ruling grid RR.

The width $\delta$ of the slits in the mask is $$\delta = \lambda b/3a$$

Wider slits would be more efficient if the light source is not a point source (or a line source). However, in this case higher frequencies, detrimental to the subtraction image quality, will pass.

While the invention has been described with respect to one preferred embodiment, it will be appreciated that many other variations, modifications and applications of the invention may be made.

What is claimed is:

1. The method of image subtraction for extracting non-common information from two light images, comprising the following steps:
   (a) projecting optically two light images simultaneously from slightly different angles onto a TV camera tube;
   (b) spacing said two light images via a grating a predetermined short distance in front of the photosensitive coating, such that the shadow of the grating interlaces the two light images on the photo-sensitive coating;

(c) scanning electronically the interlaced light images on the photosensitive coating;

(d) processing the two images to produce information which is not common to the two images.

2. The method according to claim 1, wherein said grating is formed on the outer face of the camera tube, whose inner face includes the photosensitive coating, such that said predetermined short distance is equal to the thickness of the camera tube.

3. The method according to claim 1, wherein characterized in that said grating is a Ronchi ruling grid.

4. The method according to claim 1, wherein one of said two light images is optically projected simultaneously with the other onto the photosensitive coating via a mirror which reflects the one image through a first slit to impinge the grating at a slightly different angle from that of the other image, the latter image impinging the grating through a second slit spaced from the first slit.

5. The method according to claim 4, wherein both of said slits are elongated, parallel and in a common plane, both light images passing through an imaging lens interposed between said common plane and said grid.

6. The method according to claim 5, wherein the camera tube is moved along the optical axis of the imaging lens in order to obtain precise interlacing alignment.

7. The method according to claim 1, wherein the camera tube is moved laterally of the imaging lens optical axis in order to select the portion of the light images to be electronically scanned and processed.

8. The method according to claim 1, wherein the interlaced light images on the photosensitive coating are electronically scanned by scanning them with an electronic beam to generate a high frequency signal resulting from the grid, in addition to the image information resulting from the interlaced images, whereby the common information in the two images is modulated by a frequency which is double the grid frequency, whereas the non-common information in the two images is modulated by a frequency which is equal to the grid frequency, the output of the camera tube being fed to a filter which passes only the grid frequency image information.

9. Apparatus for image subtraction in order to extract non-common information from two light images characterized in that the apparatus comprises:

a TV camera tube including a photosensitive coating on its inner face and a grating on its outer face spaced from the photosensitive coating by the thickness of the tube;

means for projecting the two light images simultaneously, from slightly different angles, onto said photosensitive coating via said grating such that the shadow of the grating interlaces the two light images on the photosensitive coating;

and means for electronically scanning said interlaced images on the photosensitive coating to produce a video output, and for processing said video output to select only the image information which is non-common to the two optical images.

10. Apparatus according to claim 9, further characterized in that said grating is a Ronchi ruling grid.

11. Apparatus according to claim 9, further characterized in that one of the two light images is optically projected simultaneously with the other from a slightly different angle by the use of a mirror disposed in front of the grating, which mirror reflects the one image through a first slit to impinge the grating at a slightly different angle than that of said other image, said other image impinging the grating through a second slit spaced from the first slit.

12. Apparatus according to claim 11, further characterized in that both of said slits are elongated, parallel and in a common plane, the apparatus further including an imaging lens interposed between said common plane and the grid through which imaging lens both light images pass before impinging the grid.

13. The apparatus according to claim 12, further characterized in that it includes means for moving the camera tube along the optical axis of the imaging lens in order to obtain precise interlacing alignment.

14. Apparatus according to claim 12, further characterized in that it includes means for moving the camera tube laterally of the imaging lens optical axis in order to select the portion of the light images to be electronically scanned and processed.

15. Apparatus according to claim 12, further characterized in that said camera tube is disposed within a housing to which are secured the mirror, a mask formed with said two slits, and the imaging lens, said apparatus further including means for moving the camera tube along the optical axis of the imaging lens in order to obtain precise interlacing alignment, and also means for moving the camera tube laterally of the optical axis of the imaging lens in order to select the portion of the light images to be electronically scanned and processed.

16. Apparatus according to claim 9, further characterized in that said electronic scanning and processing means comprises means for scanning the interlaced light image on the photosensitive coating by means of an electronic beam in order to generate a high frequency signal resulting from the grid, in addition to the image information resulting from the interlaced images, whereby the common information in the two images is modulated by a frequency which is double the grid frequency, whereas the non-common information in the two images is modulated by a frequency which is equal to the grid frequency; and filter means for passing only the grid frequency image information.

* * * * *